United States Patent [19]

LeGall et al.

[11] Patent Number: 5,049,993

[45] Date of Patent: Sep. 17, 1991

[54] FORMAT CONVERSION PREPROCESSING METHOD AND CIRCUIT

[75] Inventors: Didier J. LeGall, Los Altos, Calif.; Fure-Ching Jeng, Belle Mead, N.J.

[73] Assignee: Bell Communications Research, Inc., Livingston, N.J.

[21] Appl. No.: 592,195

[22] Filed: Oct. 3, 1990

[51] Int. Cl.⁵ .............................................. H04N 7/01
[52] U.S. Cl. ..................................... 358/140; 358/138
[58] Field of Search .................... 358/140, 138, 11, 12

[56] References Cited

U.S. PATENT DOCUMENTS

| | | | |
|---|---|---|---|
| 4,621,286 | 11/1986 | Reitmeier | 358/12 |
| 4,829,367 | 5/1989 | Dubois | 358/12 |
| 4,829,378 | 5/1989 | LeGall | 358/12 |

OTHER PUBLICATIONS

"Description of Reference Model 8 (RM8)", Document 525, CCITT SG XV, Working Party XV/4 Specialist Group for Visual Telephony, 1989.

Primary Examiner—Howard W. Britton
Attorney, Agent, or Firm—Leonard Charles Suchyta

[57] ABSTRACT

A preprocessing method and circuit is utilized to convert a video sequence between a high resolution interlaced format used when the video sequence is read out of a storage medium and a low resolution progressive format suitable for compression encoding at a low bit rate. In accordance with the inventive format conversion preprocessing algorithm, the video sequence in the high resolution interlaced format is first processed by a linear filter with a diamond-shaped passband in y−t space. The output of the linear filter is processed by a non-linear filter and the resulting signal is then decimated to produce the video signal in the low resolution progressive format. The inventive preprocessing algorithm serves to eliminate aliasing, noise, and jerkiness of motion from the sequence in the low resolution progressive format.

7 Claims, 5 Drawing Sheets

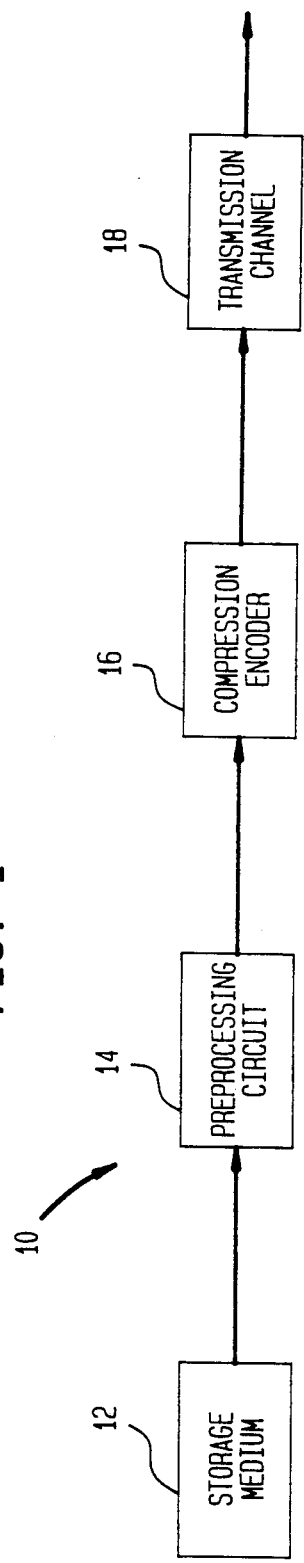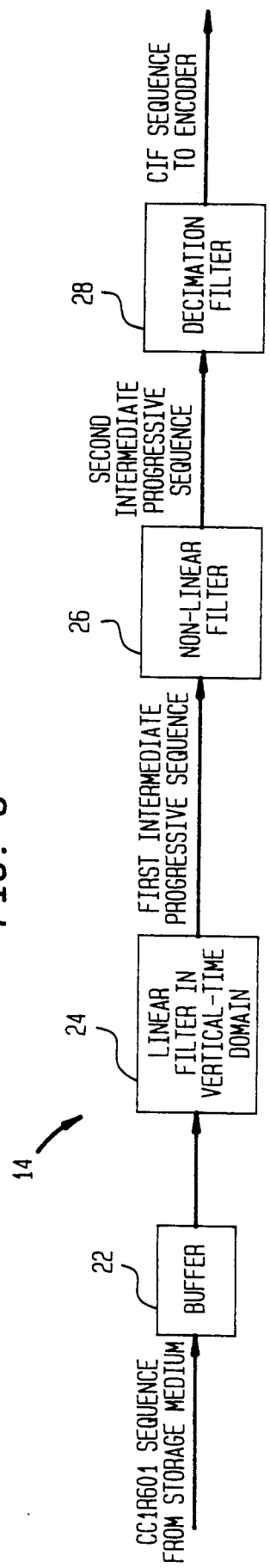

LINEAR FILTERING IN VERTICAL-TIME SPACE

NON-LINEAR FILTERING AND DECIMATION

FORMAT CONVERSION PREPROCESSING METHOD AND CIRCUIT

FIELD OF THE INVENTION

The present invention relates to an algorithm and a circuit for converting a video sequence in a high resolution interlaced format such as the CCIR 601 format into a video sequence in a lower resolution progressive format such as the CIF format.

BACKGROUND OF THE INVENTION

For many applications it is desirable to transmit video images to remote locations via a telecommunications network. Such video images are often stored in the form of a digital video signal or sequence in a storage medium such as a CD-ROM or digital tape. Typically, a digital video sequence to be transmitted to a remote location via a telecommunications network is read out of the storage medium in a high resolution interlaced format such as the CCIR 601 format. The CCIR 601 format utilizes a Y, U, V representation of a video sequence. There are 30 frames per second with each frame comprising two interlaced fields. The field size of the Y (luminance) component is 720×240 pixels per field. The field sizes of the U and V (chrominance) components are 360×240 pixels per field.

Because of bandwidth limitations in the telecommunications network, it is desirable to compress a video sequence to be transmitted to a remote location so that the video sequence occupies a bandwidth of about 1 Megabit/sec. Such compression is accomplished in two phases, a preprocessing phase and an encoding phase.

In the first or preprocessing phase, a stored video sequence is converted from a high resolution interlaced format such as the CCIR 601 format to a lower resolution progressively scanned format such as the CIF format. The CIF format utilizes a Y, U, V representation of a video sequence. There are 30 progressively scanned frames per second, with the Y component having a frame size of 360×240 pixels and the U and v components having a frame size of 180×120 pixels. Thus a frame in the CIF format has one-fourth the number of samples as a frame in the CCIR 601 format.

After conversion to the CIF format, during the second or encoding phase, the video sequence is compression encoded for transmission to a remote location. Illustratively, the compression encoder utilizes temporal predictive coding with motion compensation and transform coding as is found in the CCITT RM8 coding loop (see "Description of Reference Model 8 (RM8)", Document 525, CCITT SG XV, Working Party XV/4 Specialist Group For Visual Telephony).

A preprocessing phase involving conversion between a high resolution interlaced CCIR 601 video sequence and a lower resolution progressive CIF video sequence is utilized because the high resolution interlaced CCIR 601 sequence is not suitable for compression encoding.

Conventionally such conversion is performed by dropping every other field in the interlaced sequence to form an intermediate sequence and dropping every other column in the intermediate sequence. While this conventional conversion procedure is easy to implement, it has serious drawbacks In particular, the resulting progressive CIF sequence suffers from aliasing in the vertical and temporal directions and is noisy. Thus, when a CIF sequence is formed in the foregoing manner and compression encoded for transmission to a remote location, a high quality video image, i.e., an image with VCR quality, cannot be satisfactorily reconstructed at the remote location.

Accordingly, it is an object of the present invention to provide an improved preprocessing algorithm and circuit for converting between high resolution interlaced format such as CCIR 601 and a lower resolution progressive format such as CIF, so as to enable video images to be compression encoded and remotely transmitted with improved quality.

SUMMARY OF THE INVENTION

In accordance with the present invention, to convert between the high resolution interlaced sequence and the lower resolution progressive sequence, the high resolution interlaced sequence is first filtered in the vertical-time domain by a linear filter having a diamond-shaped pass-band to form a first intermediate progressive sequence. The first intermediate progressive sequence is then filtered by a non-linear filter to form a second intermediate progressive sequence. The values of the samples in the second intermediate progressive sequence are determined by the absolute value of the difference between corresponding samples in the first intermediate progressive sequence and the high resolution interlaced sequence.

The second intermediate progressive sequence which is output by the non-linear filter is then decimated to form the low resolution progressive sequence.

The inventive preprocessing algorithm and circuit eliminates aliasing, noise and jerkiness of motion from the low resolution progressive sequence.

BRIEF DESCRIPTION OF THE DRAWING

FIG. 1 schematically illustrates a compression process for a stored video signal.

FIG. 6 schematically illustrates a circuit for carrying out the preprocessing algorithm of the present invention.

DETAILED DESCRIPTION OF THE INVENTION

Figure 2A:
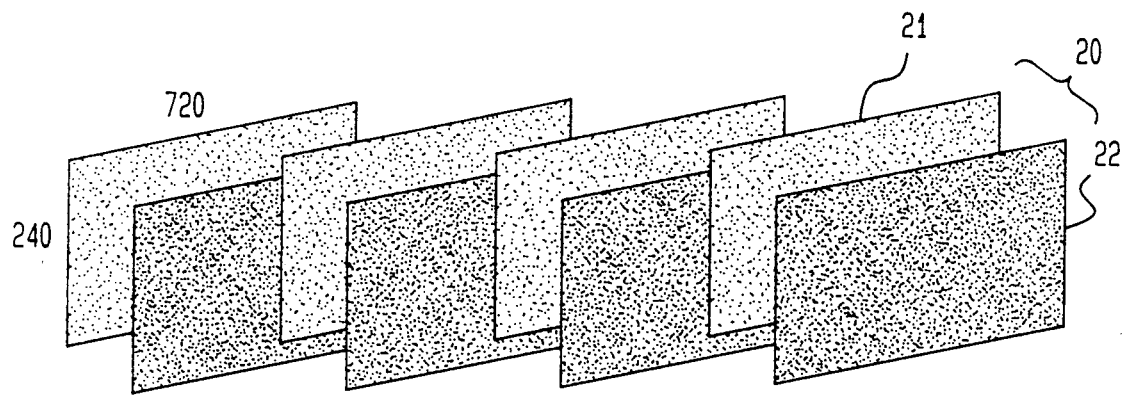
FIG. 2A illustrates the Y component of the CCIR 601 format which is the format a video signal has when it is read from a storage medium.

As indicated above, the present invention relates to a signal processing algorithm and circuit used in connection with the compression of a digital video sequence stored in a storage medium such as a compact disk or digital tape. In order to transmit the stored video sequence to a remote location via a telecommunications network, the video sequence has to be compressed because of bandwidth constraints in the telecommunications network. In particular, it is desirable to compress the video sequence so that it may be transmitted with a bandwidth below 1 Megabit/sec. The process used to compress the video sequence should result in a reconstructed image at the remote location which has VCR quality.

Turning to FIG. 1, a circuit arrangement 10 for compressing a video sequence stored in a storage medium is schematically illustrated. As shown in FIG. 1, the video sequence is stored in the storage medium 12. When read out of the storage medium 12, the video sequence is in the form of a high resolution interlaced sequence which has the CCIR 601 format. To transmit the video sequence read out of the storage medium 12 to a remote location, the video sequence has to be compressed. The compression process comprises two phases: a preprocessing phase and a compression encoding phase. During the preprocessing phase, a preprocessing circuit 14 is used to convert the high resolution interlace CCIR 601 sequence to lower resolution progressively scanned sequence which, for example, has the CIF format. The lower resolution progressively scanned CIF sequence is more suitable for high compression encoding. After conversion to the CIF format by the preprocessing circuit 14, the video sequence is encoded by the compression encoder 16 and transmitted via a channel 18 to a remote location.

As indicated above, the compression encoding is accomplished using a conventional algorithm such as CCITT Reference Model 8 (RM8) proposed for video telephony and teleconferencing. The coding algorithm is based on temporal predictive coding which utilizes motion compensation and transform coding.

The present invention is concerned with the preprocessing algorithm which in the circuit arrangement of FIG. 1 is performed by the preprocessing circuit 14.

FIG. 2A illustrates a set of frames of the Y component of a video sequence in the CCIR 601 interlaced format. The CCIR 601 format comprises 30 frames per second with each frame having two fields. Thus, for example, in FIG. 2A, the frame 20 is shown as comprising the two fields 21 and 22. As shown in FIG. 2A, each field of the Y component has 240 lines and 720 pixels per line. In each frame, each field has samples on every other line so that, for example, the first field in each frame has samples on the odd numbered lines and second field in each frame has samples on the even numbered lines. The U and v components in the CCIR 601 format are identical except that there are 360 pixels per line.

Figure 2B:
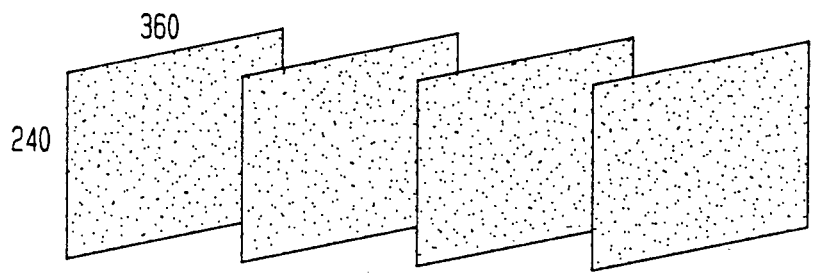
FIG. 2B illustrates the Y component of the CIF format which is a format of a video signal suitable for high compression encoding.

FIG. 2B illustrates a set of frames from the Y component of a video sequence in the CIF format. The CIF format comprises 30 progressively scanned frames per second with each frame of the Y component comprising 240 lines and 360 pixels per line. The U and V components are identical except that there are 180 pixels per line.

To convert between the CCIR 601 and CIF video sequences described above, a preprocessing algorithm which reduces noise and undesirable aliasing effects should be utilized. The conventional preprocessing algorithm produces a sequence in the CIF format which has aliasing in the vertical and temporal directions as well as noise. This noise and aliasing has an adverse effect on the quality of the reconstructed image at a remote location.

Figure 3A:
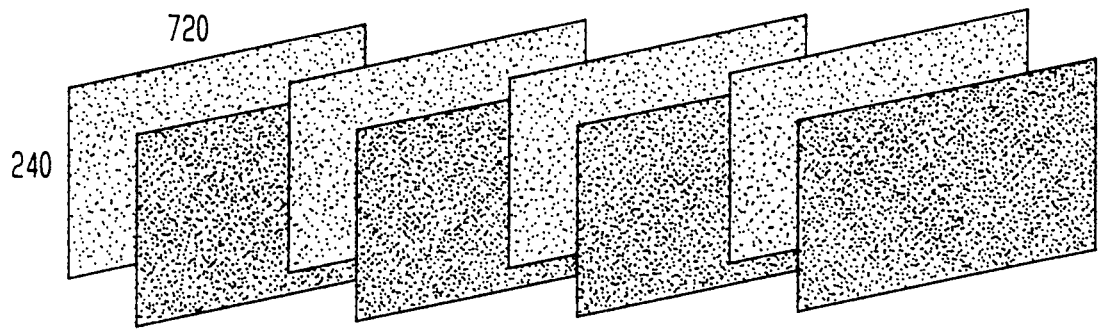
FIGS. 3A, 3B, 3C schematically illustrate a conventional preprocessing algorithm for converting between the CCIR 601 and CIF formats.
Figure 3B:
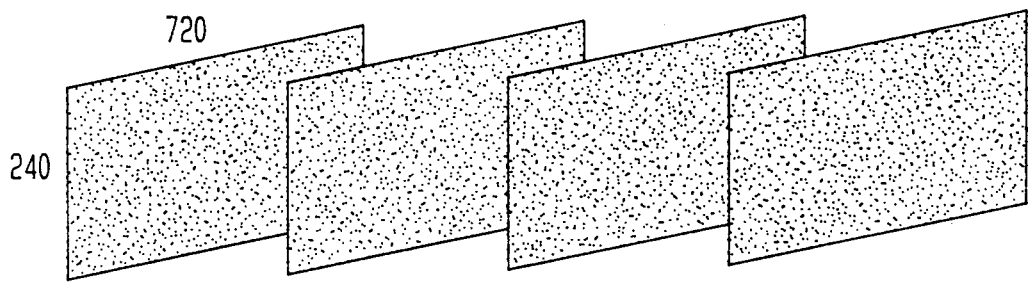
Figure 3C:
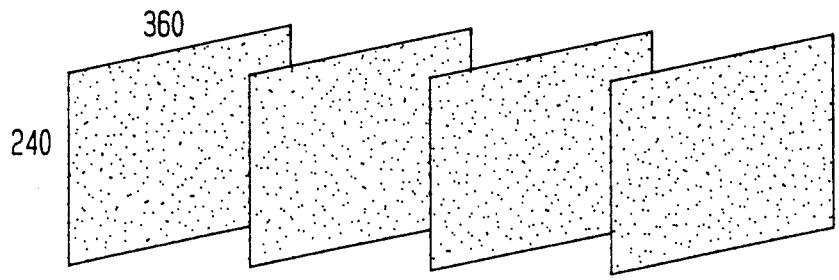

The conventional preprocessing algorithm for conversion between video sequence in the CCIR 601 and CIF formats is illustrated in FIGS. 3A, 3B, 3C. FIG. 3A shows the Y component of the full CCIR 601 interlaced sequence with each frame comprising two fields. In accordance with the conventional preprocessing algorithm, every other field in the CCIR 601 sequence is dropped. The resulting intermediate sequence is shown in FIG. 3B. The intermediate sequence of FIG. 2B is a progressively scanned sequence whose frames comprise 240 lines and 720 pixels per line, which is twice the number of pixels per line as the CIF format. The next step is to drop every other column of pixels in the frames of the intermediate sequence of FIG. 3B. The result is a sequence in the CIF format as shown in FIG. 3C. It should be noted that while FIGS. 3A, 3B, and 3C show how the Y component is processed in accordance with the conventional preprocessing algorithm, the U and V components are processed in an identical fashion. The above-described conventional algorithm has the advantage that it is easily implemented. However, the sequence in the CIF format produced by the conventional preprocessing algorithm does, as indicated above, suffer from undesired aliasing effects.

These aliasing effects as well as noise and jerkiness of motion characteristic of the conventional preprocessing algorithm are eliminated when the unique preprocessing algorithm of the present invention is utilized. In accordance with the preprocessing algorithm of the present invention, a two-dimensional linear low-pass filter with a diamond-shaped pass-band is first applied to the Y, U, and V components of a video sequence CCIR 601 format in the y−t (i.e. vertical-time) domain. A non-linear filter operation is then applied to the intermediate sequence produced by the linear low-pass diamond-shaped filter. The output of the non-linear filter operation is the decimated along the horizontal direction to produce a sequence in the CIF format.

In short, the present invention utilizes a sequence of three signal processing steps to convert from the CCIR 601 format to the CIF format. These steps are: 1) linear filtering in the vertical-time domain with a filter having a diamond-shaped pass-band, 2) non-linear filtering, and 3) decimation in the horizontal direction.

Figure 4:
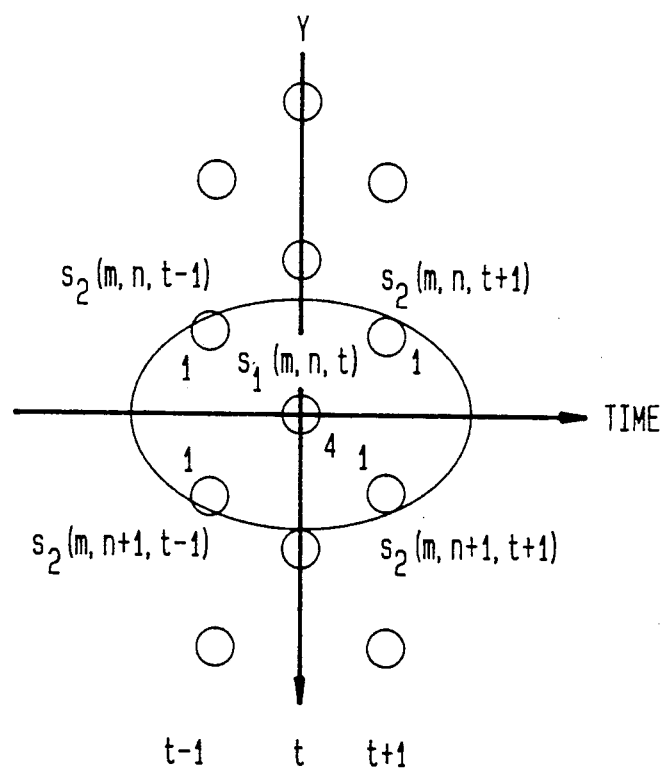
FIG. 4 illustrates a linear filter utilized to implement a unique preprocessing algorithm for converting between the CCIR 601 and CIF formats, in accordance with an illustrative embodiment of the present invention.

The operation of the linear diamond-shaped low-pass filter used in the inventive preprocessing algorithm may be understood in connection with FIG. 4.

FIG. 4 shows, for example, samples from three consecutive fields of the Y component of the high resolution interlaced CCIR 601 sequence as viewed in a y−t (i.e. a vertical-time) coordinate system. For purposes of illustration, the three consecutive fields are labeled field at time t−1, field at time t, and field at time t+1. Illustratively, the field at time t−1 is the second field of one frame and the fields at time t and time t+1 are the first and second fields of the next frame.

In general, a sample in the first field of any frame in the CCIR 601 sequence is designated by $s_1(m,n,t)$ where m is the horizontal coordinate of the sample, n is the vertical coordinate of the sample, and t is the time of the frame in which the field containing the sample is located. Similarly, a sample in the second field of any CCIR 601 frame is designated $s_2(m,n,t)$. When viewed in horizontal-vertical coordinate system, each field of the interlaced CCIR 601 format has samples on every other line. When viewed in vertical-time coordinates, the samples of an interlaced sequence have the pattern shown in FIG. 4, which pattern is known as the quincunx pattern.

In accordance with a preferred embodiment of the present invention, a linear low-pass filter with a diamond-shaped pass-band is applied to every sample in every other field of the interlaced high resolution CCIR 601 format. For example, the filter is applied to each sample of the first field in every CCIR 601 frame. Illustratively, when the linear filter is applied to a sample $s_1(m,n,t)$ in the first field of an CCIR 601 frame, the output sample is given by $$s(m,n,t) = \tfrac{1}{8}\{4s_1(m,n,t) + s_2(m,n,t-1) + s_2(m,n+1,t-1) + s_2(m,n,t+1) + s_2(m,n+1,t+1)\} \quad (1)$$

This means that when the linear filter is applied to a sample $s_1(m,n,t)$ the output sample $s(m,n,t)$ is a weighted average of $s_1(m,n,t)$ and the surrounding sample values from the preceding and following fields in the $y-t$ plane. FIG. 4 shows the samples utilized to form the weighted average and the corresponding weighting coefficient when the filter is applied to $s_1(m,n,t)$. The samples $s(m,n,t)$ form a first intermediate progressive video sequence.

Figure 5A:
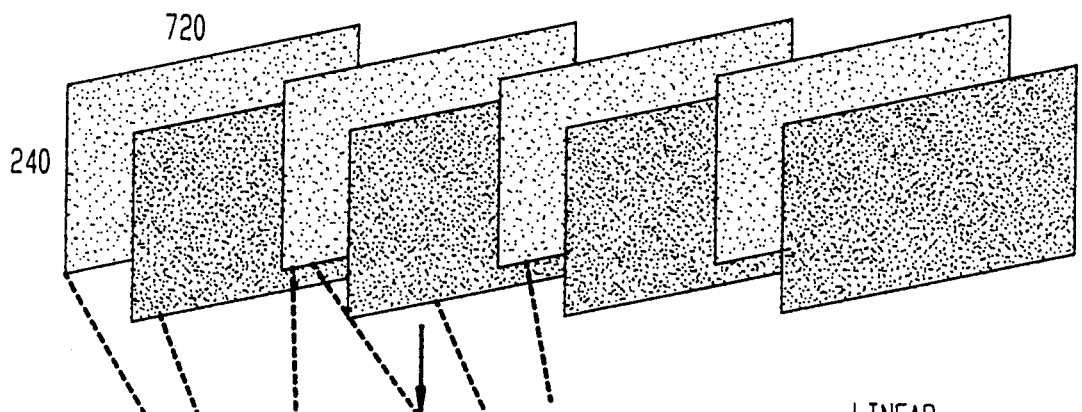
FIGS. 5A, 5B, 5C illustrate conversion between the CCIR 601 and CIF formats in accordance with the preprocessing algorithm of the present invention.
Figure 5B:
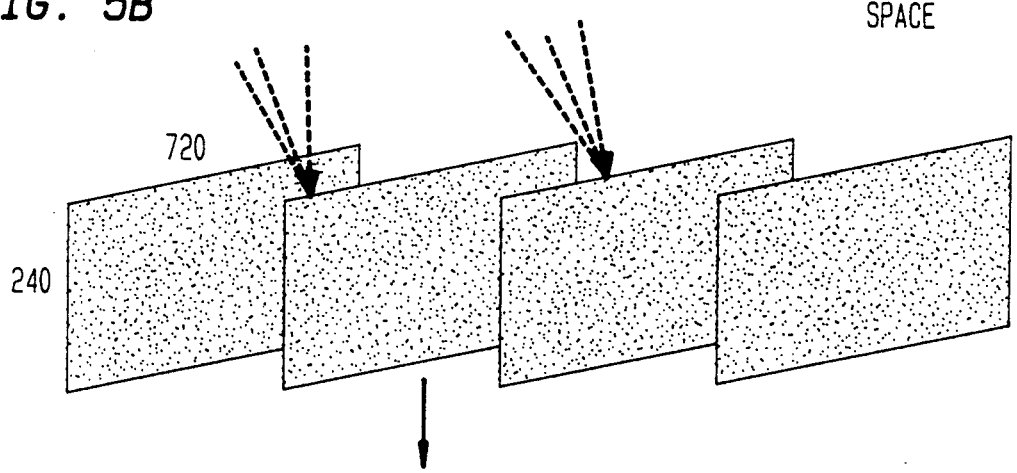

The operation of the linear diamond-shaped filter may also be described as follows. As indicated above, in the conventional preprocessing algorithm to convert from the interlaced CCIR 601 sequence to the CIF progressive sequence, the first step is to form an intermediate progressive sequence (see FIG. 3B) by simply dropping every other field in the interlaced CCIR 601 sequence. In the present invention, when converting to a progressive sequence as a result of processing by the linear filter, each sample $s(m,n,t)$ in a frame of a first intermediate progressive sequence is formed from a weighted average taken from three fields of the original CCIR 601 sequence. This can be understood better in connection with FIG. 5A and FIG. 5B. FIG. 5A shows the Y component of the interlaced CCIR 601 sequence wherein each frame comprises two fields. FIG. 5B shows the frames of the Y component of a first intermediate progressive sequence which results from applying the linear filter described above to the first field of each frame of the Y component in the CCIR 601 sequence. As schematically illustrated in FIGS. 5A and 5B, a weighted average of samples in three fields of the Y component of the CCIR 601 sequence (FIG. 5A) are used to obtain the samples $s(n,m,t)$ in each frame of the Y component of the first intermediate progressive sequence (FIG. 5B). As shown in FIG. 5B, each frame therein has dimensions of 720×240 pixels. It should be noted that the same linear filter is applied to the U and V components of the CCIR 601 sequence as is applied to the Y component.

As a result of application of the linear diamond-shaped low-pass filter, the resulting first intermediate progressive sequence has less aliasing than is the case when the simple field dropping procedure of the conventional preprocessing algorithm is utilized. However, the first intermediate sequence produced by the application of the linear filter in the $y-t$ domain has false contour artifacts, which are not pleasant to the human visual system. Also the spatial and temporal resolutions are reduced significantly.

In order to improve the sharpness of the image and reduce false contour artifacts, the samples of the first intermediate progressive sequence $s(m,n,t)$ produced by the linear filter are processed by a non-linear filter. Based on the local spatial detail and temporal activity in the first intermediate sequence, i.e., based on the absolute value of the difference between the original sample value $s_1(m,n,t)$ from the original interlaced sequence, and the corresponding sample value $s(m,n,t)$ in the first intermediate sequence, the output of the non-linear filter is either the original sample value $s_1(m,n,t)$, the linearly filtered sample value $s(m,n,t)$, or a weighted sum of $s_1(m,n,t)$ and $s(m,n,t)$.

The detailed operation of the non-linear filter is as follows. Denote the output of the non-linear filter as a second intermediate progressive sequence whose samples are labeled $p(m,n,t)$ and define $\Delta(m,n,t)$ to be equal to $|s(m,n,t)-s_1(m,n,t)|$, i.e. $\Delta(m,n,t)$ is equal to the absolute value of the difference between the linearly filtered sample and the original sample. The non-linear filtering operation involves defining two thresholds $d_1$ and $d_2$ where $d_1 < d_2$. If $\Delta(m,n,t)$ is less than $d_1$, then the output of the non-linear filter is the output of the linear filter. This step reduces aliasing effects and noise. If $\Delta(m,n,t)$ is greater than $d_2$, the original unfiltered sample value $s_1(m,n,t)$ is the output of the non-linear filter. This step serves to retain the sharpness of the image which may be weakened by the linear filtering. If $\Delta(m,n,t)$ is between $d_1$ and $d_2$, a weighted sum of the linearly filtered sample value and the original sample value is used as the output of the non-linear filtering operation. This step reduces the visibility of false contours.

Thus, the operation of the non-linear filter may be summarized as follows:

$$p(m, n, t) = \begin{cases} s(m, n, t) & \text{if } \Delta(m, n, t) < d_1 \\ \lambda s_1(m, n, t) + (1 - \lambda)s(m, n, t) & \text{if } d_1 \leq \Delta(m, n, t) \leq d_2 \\ s_1(m, n, t) & \text{if } \Delta(m, n, t) > d_2 \end{cases} \quad (2)$$

$$\text{where } \lambda \longrightarrow = \frac{\Delta(m, n, t) - d_1}{d_2 - d_1}$$

Illustratively, the thresholds $d_1$, $d_2$ are set at $d_1=30$ and $d_2=70$.

The size of each frame in the second intermediate sequence $p(m,n,t)$ is the same as each frame in the first intermediate sequence $s(m,n,t)$ (see FIG. 5B) which is 720×240 in the case of the Y component. To complete the conversion of the CCIR 601 format to the CIF format, $p(m,n,t)$ needs to be decimated in half in the horizontal direction. This can be accomplished using a simple one dimensional low-pass filter given by $$z(m,n,t) = \tfrac{1}{4}\{p(2m-1,n,t) + 2p(2m,n,t) + p(2m+1,n,t)\} \quad (3)$$

Figure 5C:
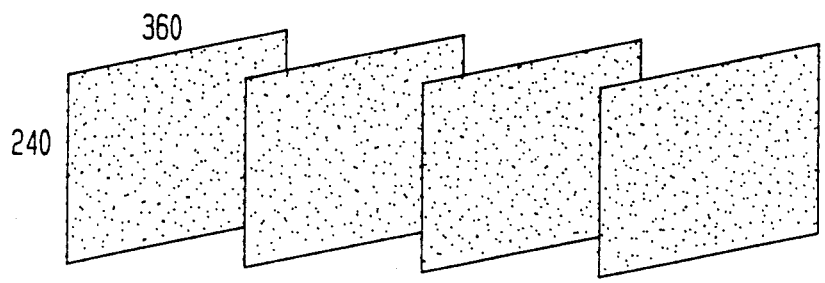

The resulting frames of the Y component in the CF format comprised of the samples $z(m,n,r)$ and having a size of 360×240 are shown schematically in FIG. 5C. The U and V components are processed identically to the Y component and have a frame size of 180×240 in the CIF format.

The preprocessing algorithm of the present invention may be summarized in connection with FIG. 6 which schematically illustrates a preprocessing circuit 14 (see FIG. 1) for carrying out the inventive preprocessing algorithm. A video sequence having a high resolution interlaced CCIR 601 format to be compression encoded for remote transmission is received in the circuit 14 at the buffer 22 which has the capacity to store at least three fields of the interlaced sequence. The reason for the buffer 22 is that the linear low-pass diamond-shaped filter 24 operates in the vertical-time plane and requires samples from three fields of the original interlaced sequence. The output samples of the linear filter 24 which form a first intermediate progressive sequence are processed by a non-linear filter 26 to form a second intermediate progressive sequence. The second intermediate progressive sequence is then decimated by the decimation filter 28 to form a sequence in the CIF format which is then transmitted to an encoder.

Finally, the above-described embodiments of the invention are intended to be illustrative only. Numerous alternative embodiments may be devised by those skilled in the art without departing from the spirit and scope of the following claims.

What is claimed is:

1. A method for converting between a high resolution interlaced video sequence having two fields per frame and a low resolution progressive video sequence comprising the steps of filtering said interlaced sequence in the vertical-time domain with a low-pass linear filter having a diamond-shaped pass-band to form a first intermediate progressive sequence, filtering said first intermediate progressive sequence with a non-linear filter to form a second intermediate progressive sequence, and decimating said second intermediate progressive sequence to form said low resolution progressive sequence.

2. The method of claim 1 wherein each sample $s(m,n,t)$ in a frame of said first intermediate progressive sequence is formed by said linear filter as a weighted average of samples in a plurality of successive fields of said high resolution interlaced video sequence.

3. The method of claim 1 wherein each sample $s(m,n,t)$ in a frame of said first intermediate progressive sequence is formed by applying said linear filter to each sample $s(m,n,t)$ in one field of a frame of said high resolution interlaced video sequence and forming a weighted average of $s(m,n,t)$ and adjacent samples in the preceding and succeeding fields of the interlaced sequence.

4. The method of claim 3 wherein each sample $p(m,n,t)$ in a frame of said second intermediate progressive sequence is equal to a corresponding sample $s(m,n,t)$ from a frame of the first intermediate sequence, or equal to a corresponding sample $s(m,n,t)$ from a field of the high resolution interlaced sequence, or equal to a linear combination of the corresponding samples from the first intermediate progressive sequence and the high resolution interlaced sequence, depending on the absolute value of the difference between the sample from the first intermediate sequence and the sample from the high resolution interlaced sequence.

5. A circuit for converting between a high resolution interlaced video sequence and a low resolution progressive video sequence comprising, linear filter means having a diamond-shaped pass band for filtering said interlaced sequence in the vertical-time domain, to form a first intermediate progressive sequence, a non-linear filter for filtering said first intermediate progressive sequence to form a second intermediate progressive sequence, and means for decimating said second intermediate progressive sequence to form said low resolution progressive sequence.

6. The circuit of claim 5 wherein said linear filter forms a sample in a frame of said first intermediate sequence by forming a weighted average of a sample in one field of a frame of said interlaced sequence and neighboring samples in the preceding and succeeding fields of the interlaced sequence.

7. The circuit of claim 6 wherein the value of an output sample of said non-linear filter in said second intermediate sequence is determined by the absolute value of the difference between a sample in said first intermediate sequence and a corresponding sample in a field of said interlaced sequence.

* * * * *